(12) United States Patent
Zhang et al.

(10) Patent No.: US 9,576,012 B2
(45) Date of Patent: Feb. 21, 2017

(54) HIERARCHICAL TABLESPACE SPACE MANAGEMENT

(71) Applicant: Oracle International Corporation, Redwood Shores, CA (US)

(72) Inventors: Wei Zhang, Foster City, CA (US); Sujatha Muthulingam, Sunnyvale, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 598 days.

(21) Appl. No.: 13/804,197

(22) Filed: Mar. 14, 2013

(65) Prior Publication Data
US 2014/0279849 A1    Sep. 18, 2014

(51) Int. Cl.
*G06F 17/30* (2006.01)

(52) U.S. Cl.
CPC .. *G06F 17/30339* (2013.01); *G06F 17/30312* (2013.01); *G06F 17/30002* (2013.01)

(58) Field of Classification Search
CPC ......... G06F 17/30002; G06F 17/30312; G06F 17/30339
USPC ........................................................ 707/609
See application file for complete search history.

(56) References Cited

U.S. PATENT DOCUMENTS

| | | | | |
|---|---|---|---|---|
| 6,732,124 | B1* | 5/2004 | Koseki | G06F 11/1435 |
| 7,154,888 | B1* | 12/2006 | Li | H04L 45/742 |
| | | | | 370/389 |
| 7,236,493 | B1* | 6/2007 | McRae | H04L 63/101 |
| | | | | 370/392 |
| 2003/0220951 | A1* | 11/2003 | Muthulingam | G06F 3/0608 |
| 2006/0117029 | A1* | 6/2006 | Yingst | G06F 17/30365 |
| 2007/0005669 | A1* | 1/2007 | Mueller | G06F 17/30312 |
| 2013/0124466 | A1* | 5/2013 | Naidu | G06F 17/30575 |
| | | | | 707/610 |
| 2014/0129530 | A1* | 5/2014 | Raufman | G06F 7/78 |
| | | | | 707/693 |

* cited by examiner

*Primary Examiner* — Thanh-Ha Dang
(74) *Attorney, Agent, or Firm* — Hickman Palermo Becker Bingham LLP

(57) ABSTRACT

A method, apparatus, and system for hierarchical organization of tablespace free space metadata in a database are provided. The hierarchy is divided into at least two levels: level 1 or L1 bitmap blocks are stored as a shared data structure and map free space in a tablespace, whereas level 2 or L2 bitmap blocks are stored as separate local copies at each database instance and map to the L1 bitmap blocks. This hierarchical organization provides a mechanism for finer grained concurrency control, enabling highly parallel tablespace metadata processing to accommodate the performance requirements of large tablespaces with big data sets. By integrating the hierarchical organization as part of the tablespace stack layer in a database management system (DBMS), implementations can be provided transparently to database end users without demanding any additional administrative, maintenance, or development burdens.

33 Claims, 6 Drawing Sheets

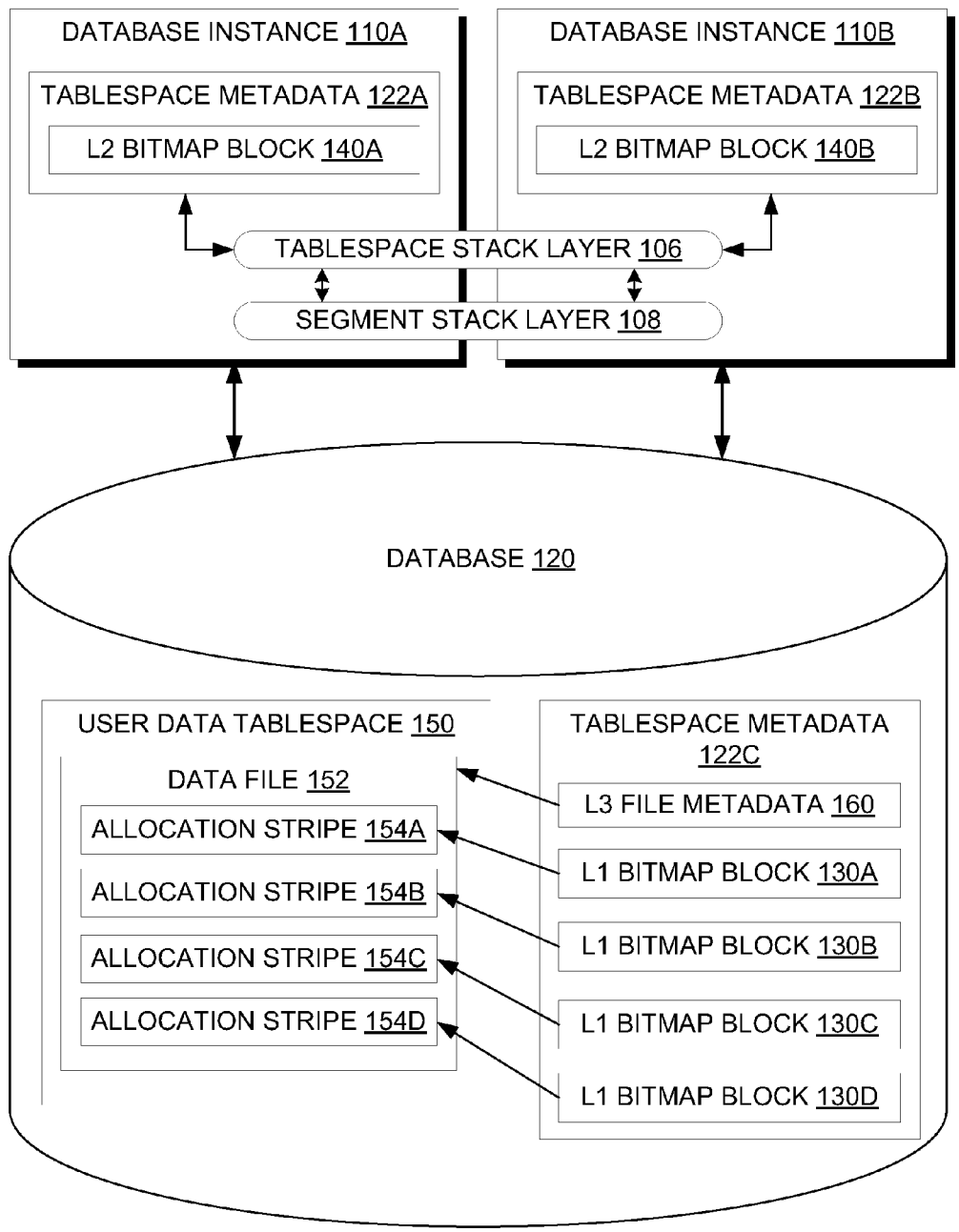

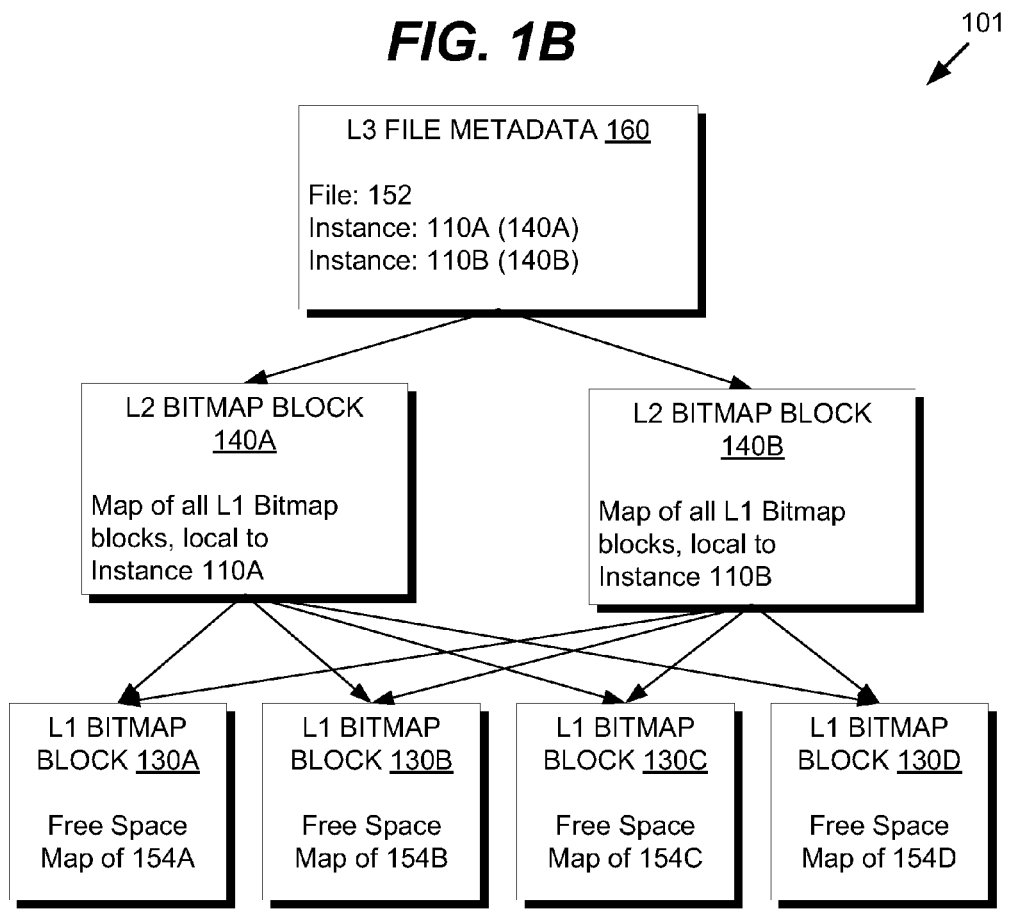

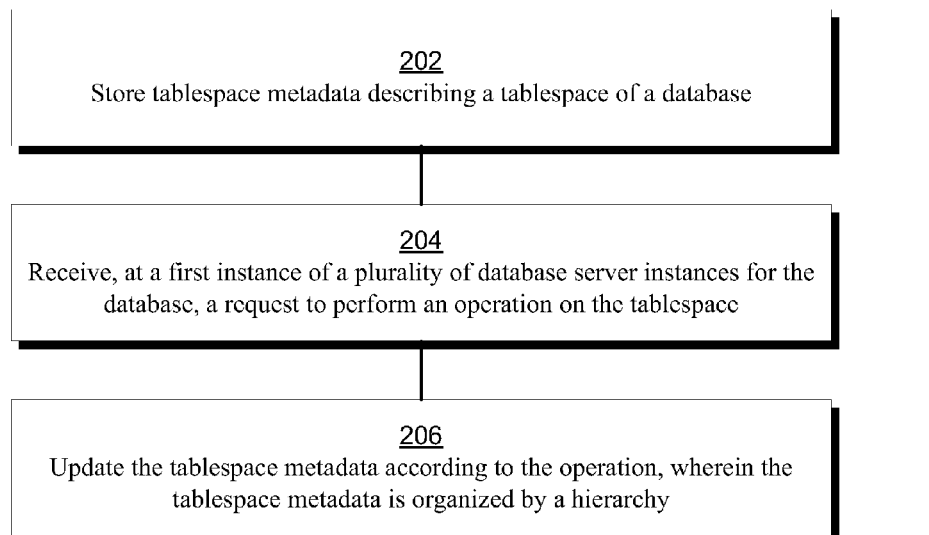
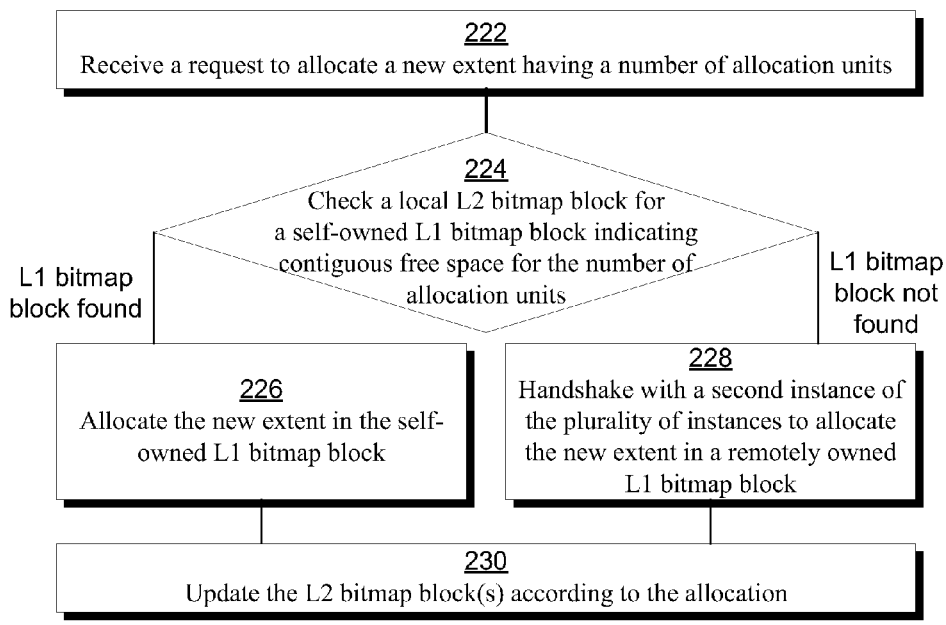

HIERARCHICAL TABLESPACE SPACE MANAGEMENT

FIELD OF THE INVENTION

The present disclosure relates to databases, and more specifically, to hierarchical tablespace space management.

BACKGROUND

As the amount of data to be generated and processed steadily increases over time, existing database paradigms cannot meet the performance requirements to support working with big data sets. Database management systems must be able to scale to highly parallel multi-server environments where data may be read and written concurrently by multiple database instances.

An area of particular importance is the allocation and management of free space within a tablespace. One approach is to use locally-managed tablespaces, where each tablespace manages its own local free space bitmaps. In this approach, concurrent free space operations from single or multiple database instances must obtain a latch on a local free space bitmap associated with a data file, necessitating the serialization of such free space operations.

With continual exponential improvements in processor speed and memory capacities, the actual database transactions complete so quickly that the associated tablespace free space maintenance overhead becomes a noticeably larger proportion of the total processing wait time. Since free space operations must be serialized for each free space bitmap, the use of locally-managed tablespaces becomes less appropriate for tablespaces with big data sets demanding high levels of data concurrency. While attempts have been made to improve free space maintenance concurrency by manually splitting a locally-managed tablespace into several data files with independent local free space bitmaps, this fragmenting severely complicates end user database administration, management, and development tasks.

Based on the foregoing, there is a need for a tablespace free space management method that can scale to big data sets while minimizing complexity for end users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that depicts an example database management system with hierarchical tablespace metadata, according to an embodiment;

FIG. 1B is a block diagram that depicts a hierarchical organization of tablespace metadata, according to an embodiment;

FIG. 2A is a flow diagram that depicts a process for performing a database operation using hierarchical tablespace metadata, according to an embodiment;

FIG. 2B is a flow diagram that depicts a process for allocating a new extent by a tablespace stack layer using hierarchical tablespace space management, according to an embodiment;

DETAILED DESCRIPTION

Figure 1C:
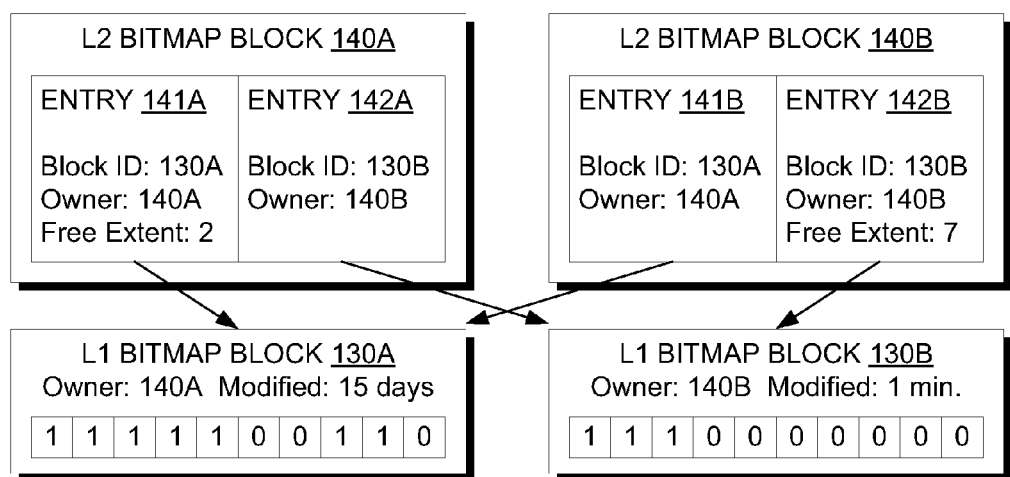
FIG. 1C, FIG. 1D, FIG. 1E, and FIG. 1F are block diagrams that depict example bitmap blocks of tablespace metadata, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The approaches described herein provide a hierarchical organization of tablespace free space metadata. The hierarchical organization provides a mechanism for finer grained concurrency control, enabling highly parallel tablespace metadata processing to accommodate the performance requirements of large tablespaces with big data sets. By integrating the hierarchical organization as part of the tablespace stack layer in a database management system (DBMS), implementations can be provided transparently to database end users without demanding any additional administrative, maintenance, or development burdens.

Database Management System Logical Overview

FIG. 1A is a block diagram that depicts an example database management system with hierarchical tablespace metadata, according to an embodiment. Database management system (DBMS) 100 of FIG. 1A includes tablespace stack layer 106, segment stack layer 108, database instance 110A, database instance 110B, and database 120. Database instance 110A includes tablespace metadata 122A. Tablespace metadata 122A includes L2 bitmap block 140A. Database instance 110B includes tablespace metadata 122B. Tablespace metadata 122B includes L2 bitmap block 140B. Database 120 includes user data tablespace 150 and tablespace metadata 122C. User data tablespace 150 includes data file 152. Data file 152 includes allocation stripe 154A, allocation stripe 154B, allocation stripe 154C, and allocation stripe 154D. Tablespace metadata 122C includes L3 file metadata 160, L1 bitmap block 130A, L1 bitmap block 130B, L1 bitmap block 130C, and L1 bitmap block 130D.

Note that database management system 100 in FIG. 1A is highly simplified, with many logical database components omitted for clarity. For example, database 120 may include several other tablespaces including system tablespaces with system dictionaries and other data structures. Undo/redo records, temporary tablespaces, and other elements are also omitted from database management system 100.

Database management system 100 is shown in FIG. 1A with software modules organized into stack layers, including tablespace stack layer 106 and segment stack layer 108. The term "stack layer" refers to a set of software modules in database management system 100 that are dedicated to specific functionality, at least to some extent.

For example, tablespace stack layer 106 may primarily include software modules that operate and function on tablespaces, such as user data tablespace 150. These operations may include creating new tablespaces or deleting tablespaces, managing tablespace data files and space allocation, expanding tablespaces, and maintaining tablespace metadata, such as tablespace metadata 122A, 122B, and 122C.

User data tablespace 150 may be configured as a bigfile tablespace, or one with a single large data file 152 rather than multiple smaller data files. As shown in FIG. 1A, tablespace stack layer 106 is shown to span across database instances 110A-110B, indicating that each database instance may execute a local instance of tablespace stack layer 106 that is also multi-instance aware.

The allocating and management of segments may be handled by segment stack layer 108. Similar to tablespace stack layer 106, segment stack layer 108 can execute on multiple database instances with local instances that are multi-instance aware. Segments in data file 152 can define various database schema objects or object partitions including tables and indexes. Each segment is defined by one or more extents, or contiguous sets of allocation blocks. An extent is usually a variable number of allocation blocks, but in some embodiments each extent may be a fixed number of allocation blocks. The first block of each segment may include a directory of all the associated extents, or an extent map. For simplicity, data file 152 may contain only a single segment defining a very large user database table.

As shown in FIG. 1A, tablespace stack layer 106 can call or invoke software modules in segment stack layer 108 and vice versa. Software modules in a stack layer can also internally call software modules within the same stack layer. While only two stack layers are shown in database management system 100 of FIG. 1A, database management system 100 can include any number of software stack layers.

Performing an operation in database management system 100 typically involves calling multiple layers, with stack layers calling other stack layers. These calls can involve many stack layers in deeply nested and recursive traversals. One example is a SQL statement for the insertion of rows into a table. A SQL stack layer (not shown) may receive and analyze the SQL statement to formulate and carry out an execution plan, invoking segment stack layer 108 to find free space for the rows in the specified table. Segment stack layer 108 may match the specified table to the appropriate segment and invoke tablespace stack layer 106 to find a free extent with enough space for the rows. Tablespace stack layer 106 may find or create the free extent in data file 152, updating tablespace metadata 122A-122C as necessary. The call returns back to segment stack layer 108, which may update the extent map for the segment. The call returns back to the SQL stack layer, which can now pass the free extent to a data stack layer (not shown) to insert the rows. The data stack layer formats the rows as row data and stores it in the free extent, updating any associated indexes or other row metadata as necessary.

Tablespace Metadata Logical Overview

When the user database table or data file 152 is sufficiently small, a single database instance may be sufficient to service all database operations for data file 152. However, if data file 152 contains a big data set, for example a database table that is 32 terabytes or greater, then a single database instance cannot provide sufficient performance. To provide reasonable turnaround times, multiple database instances are necessary to service database operations for data file 152. For simplicity, only two database instances 110A and 110B are shown in FIG. 1A; other embodiments may use any number of database instances to scale with the database workload.

If tablespace space management methods such as locally managed tablespaces are utilized, then each instance will waste a significant portion of time waiting for another instance to complete the serialized free space operations. While data file 152 can be manually split into multiple smaller data files, this greatly complicates database administration and management.

Accordingly, a hierarchical organization of tablespace free space metadata is proposed to enable a high level of concurrency with low overhead. As shown in FIG. 1, each database instance 110A and 110B includes a local tablespace metadata 122A and 122B, respectively. Additionally, database 120 includes a tablespace metadata 122C. Each tablespace metadata includes metadata belonging to a certain hierarchy level, level 1 (L1), level 2 (L2), or level 3 (L3), where L1 is the lowest level closest to the allocation unit and L3 is a higher level overview. Since the functions relating to tablespace management are substantially dedicated to tablespace stack layer 106, an implementation can be readily provided for an existing database management system by replacing or supplementing a locally-managed tablespace implementation of a tablespace stack layer with the hierarchical tablespace metadata implementation of tablespace stack layer 106.

Tablespace metadata 122C includes a set of L1 bitmap blocks 130A-130D, which track free space allocation in a respective allocation stripe 154A-154D, which each contain a set of allocation units. By splitting a large data file 152 into smaller manageable sets of allocation units with corresponding L1 bitmap blocks, tablespace free space management can be carried out with higher levels of concurrency as each L1 bitmap block may be independently modified. The number of allocation units in an allocation stripe may be a fixed size and may be calibrated based on the size of data file 152, the number of database instances available, and other factors.

Each database instance 110A-110B has shared access to any of the L1 bitmap blocks 130A-130D. However, to minimize contention, each of the L1 bitmap blocks only indicates an ownership affinity, or instance affinity, with a single database instance that is exclusively allowed to write or modify the specified L1 bitmap block. This ownership affinity may be indirectly indicated by specifying a L2 bitmap block, which has a one-to-one assignment with a particular database instance. Other instances can write and modify the L1 bitmap block by handshaking with the indicated owner to queue a transaction, rather than by directly modifying the L1 bitmap block.

The ownership affinities may also be tracked at level 2, or by L2 bitmap blocks 140A and 140B. More specifically, at each database instance 110A-110B, a separate and distinct L2 bitmap block is maintained, which references each and every L1 bitmap block as well as their instance ownership affinities. When tablespace stack layer 106 needs to allocate an extent for a specific database instance, for example to extend a segment requested by segment stack layer 108, tablespace stack layer 106 may begin by querying candidate L1 bitmap blocks owned by that specific database instance, as indicated by the local L2 bitmap block. If no suitable L1 bitmap block is found, then candidate L1 bitmap blocks may be requested from other database instances. As shown in FIG. 1A, tablespace stack layer 106 is multi-instance aware and can communicate with other database instances if necessary.

Once a suitable L1 bitmap block is found from a local or remote L2 bitmap block, where the L1 bitmap block has enough space for the extent, then the space may be marked as allocated in the L1 bitmap block. Depending on the access pattern for the chosen L1 bitmap block, ownership affinity of the L1 bitmap block may also be transferred.

By assigning ownership affinity of L1 bitmap blocks to specific database instances, each database instance can independently manage their own portion of free space within user data tablespace 150. By preferring self-owned L1 bitmap blocks when searching for free space to allocate extents, each database instance 110A-110B can manage tablespace free space in parallel while minimizing expensive communications overhead between instances. The term "self-owned" here refers to those L1 bitmap blocks having an ownership affinity matching the assigned database instance for the L2 bitmap block. Additionally, self-owned L1 bitmap blocks may be cached at a buffer cache of each database instance for rapid querying. Database instances only need to communicate when a local L2 bitmap block is exhausted of self-owned L1 bitmap blocks with sufficient free space to satisfy a new extent request.

The level 3 or L3 file metadata 160 provides a higher level overview of the hierarchy. L3 file metadata 160 includes filesystem metadata for user data tablespace 150, such as a pointer and file size for data file 152. L3 file metadata 160 also includes instance metadata identifying all database instances for database 120 including database instances 110A-110B and their respective L2 bitmap blocks 140A-140B. L3 file metadata 160 may also store various settings and parameters associated with user data tablespace 150. The above summarized hierarchical organization of the tablespace metadata is also shown more explicitly in conjunction with FIG. 1B below.

Physical System Overview

Note that FIG. 1A is primarily a logical diagram that does not specify a particular physical arrangement of database management system 100. Accordingly, various physical arrangements are possible for database management system 100 of FIG. 1A. For example, each database instance 110A-110B may execute on separate physical database servers. Alternatively, the database instances 110A-110B may execute on a single consolidated database server, or a mix of dedicated and consolidated database servers may be used.

Additionally, while a specific storage layout is not specified in FIG. 1A, an automatic storage manager may execute alongside each database instance to handle the storage interfacing details. For example, the data within database 120 may be stored on multiple storage devices in various configurations such as RAID arrays and tiered storage levels to improve storage availability, utilization, and I/O performance. Additionally, while not specifically shown in database management system 100, one or more database storage servers may be present to service data access requests for database 120.

To optimize disk access, tablespace metadata 122C may be placed into pre-allocated metadata areas. For example, each L1 bitmap block 130A-130D may be located in a pre-allocated metadata header area within their respective allocation stripe 154A-154D. In this manner, the allocation stripes can be self-representative allocation stripes, providing all the relevant metadata via a single sequential block read and avoiding the need for expensive random I/O to locate and read the metadata.

Hierarchical Organization

FIG. 1B is a block diagram that depicts a hierarchical organization of tablespace metadata, according to an embodiment. Diagram 101 of FIG. 1B includes L3 file metadata 160, L2 bitmap block 140A, L2 bitmap block 140B, L1 bitmap block 130A, L1 bitmap block 130B, L1 bitmap block 130C, and L1 bitmap block 130D. With respect to FIG. 1B, like numbered elements may correspond to the same elements from FIG. 1A.

As shown in diagram 101, the top of the hierarchy begins with L3 file metadata 160, which includes a pointer to data file 152 and a reference to database instances 110A and 110B, which respectively include L2 bitmap blocks 140A and 140B.

Moving down to the next level in FIG. 1B and referring back to FIG. 1A, each database instance 110A and 110B maintains its own local L2 bitmap block 140A and 140B. L2 bitmap blocks 140A-140B each map to every L1 bitmap block. However, the specific contents of each L2 bitmap block may differ from each other. For example, each L2 bitmap block may have more metadata concerning self-owned L1 bitmap blocks and less metadata concerning L1 bitmap blocks owned by other database instances.

At the lowest level in FIG. 1B and referring back to FIG. 1A, each L1 bitmap block indicates the free space for a corresponding allocation stripe containing a set of allocation units. An allocation unit is the smallest addressable storage unit for tablespace stack layer 106 and is a fixed size, which can span multiple storage blocks on disk. Each bit in the L1 bitmap block may map to one allocation unit within the corresponding allocation stripe. In other embodiments, each bit in the L1 bitmap block may map to a fixed number of contiguous allocation units. Additionally, each L1 bitmap block may indicate an ownership affinity with a particular L2 bitmap block owned by a particular database instance. Additional metadata such as last time accessed, last time modified, and other statistics may also be tracked in L1 bitmap blocks, which may be recorded for the block as a whole and/or for each individual bit mapping within the L1 bitmap block.

Example Tablespace Metadata

FIG. 1C, FIG. 1D, FIG. 1E and FIG. 1F are block diagrams that depict example bitmap blocks of tablespace metadata, according to an embodiment. Diagram 102, 103, 104, and 105 of FIG. 1C, FIG. 1D, FIG. 1E, and FIG. 1F respectively include L2 bitmap block 140A, L2 bitmap block 140B, L1 bitmap block 130A, and L1 bitmap block 130B. L2 Bitmap block 140A includes entry 141A and entry 142A. L2 Bitmap block 140B includes entry 141B and entry 142B. With respect to FIG. 1C-1F, like numbered elements may correspond to the same elements from FIG. 1B.

For simplicity, the number of L1 bitmap blocks under consideration is reduced to two, or L1 bitmap blocks 130A and 130B in FIG. 1C-1F. Accordingly, each L2 bitmap block 140A-140B in FIG. 1C-1F only includes two entries. However, if L2 bitmap blocks 140A-140B in FIG. 1B were to be fully populated, then each would include four entries that reference all four L1 bitmap blocks 130A-130D.

Additionally, while the bitmaps shown in L1 bitmap blocks 130A-130B are shown to include only a single binary value to indicate allocated (1) or free space (0) in the mapping, other embodiments may also include arrays, even multi-dimensional arrays, with data types other than binary values. Alternatively, this additional metadata may be stored in a separate property map. In this manner, additional metadata other than the binary allocated/free space state can also be represented within the mapping.

Figure 1D:
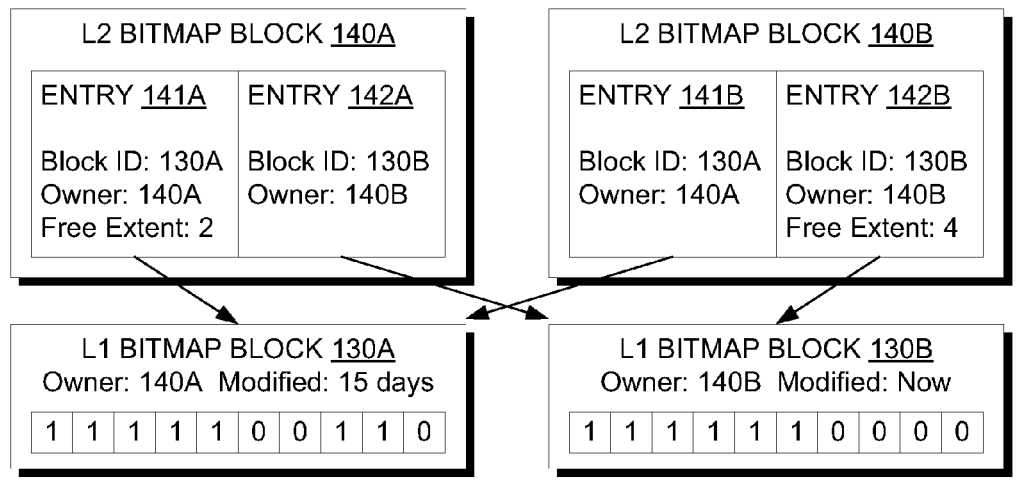

FIG. 1D may represent a state change from FIG. 1C after tablespace stack layer 106 at database instance 110A answers a request to allocate an extent of 3 allocation units. Similarly, FIG. 1F may also represent a state change from FIG. 1E after answering a similar request. The specific details of the state changes in FIG. 1C-1F are explained in further detail below in conjunction with FIG. 2B. However, to explain the structure of the L2 and L1 bitmap blocks in the headings below, only the example data in FIG. 1C shall be discussed.

Level 2 Bitmap Blocks

Examining L2 bitmap block 140A in FIG. 1C, a mapping of L1 bitmap blocks is shown. The first entry 141A is for L1 bitmap block 130A, identified by block ID 130A. The ownership affinity is set to L2 bitmap block 140A, which corresponds to database instance 110A as shown in FIG. 1A. Accordingly, L1 bitmap block 130A is a self-owned bitmap block for L2 bitmap block 140A. L2 bitmap block 140A may record additional free-space metadata for self-owned blocks, since database instance 110A can be confident that other database instances will not modify L1 bitmap block 130A. In entry 141A, this is reflected by the additional free-space metadata "Free Extent: 2", which indicates that the largest extent that can be allocated in L1 bitmap block 130A is 2 L1 bits wide, or 2 allocation units if each bit in L1 bitmap block maps to a single allocation unit. This is only one example additional free-space metadata that could be stored; other embodiments may include free space block lists, allocation fill percentages, and other metadata.

The next entry 142A is for L1 bitmap block 130B, identified by block ID 130B. The ownership affinity is set to L2 bitmap block 140B, which corresponds to database instance 110B as shown in FIG. 1A. Accordingly, L1 bitmap block 130B is owned by a different database instance. Since database instance 110A may not ascertain the latest state of L1 bitmap block 130B without consulting with database instance 110B, it is preferable to maintain less metadata for entry 142A to reduce handshaking between database instances. As a result, detailed metadata such as the largest available extent may not be tracked for L1 bitmap blocks owned by other database instances, such as L1 bitmap block 130B, since other database instances may modify their owned L1 bitmap blocks any time.

L2 bitmap block 140B maps to the same L1 bitmap blocks in a similar fashion as L2 bitmap block 140A. However, since L2 bitmap block 140B is the owner of L1 bitmap block 130B, entry 142B maintains the detailed metadata "Free Extent: 7" for block ID 130B. On the other hand, since L1 bitmap block 130A is owned by another database process, entry 141B does not maintain any detailed metadata for block ID 130A.

Level 1 Bitmap Blocks

Turning to the L1 bitmap blocks, L1 bitmap block 130A contains a free space bitmap having 10 entries referencing 10 L1 bits. The free space bitmap indicates that L1 bits 0-4 and 7-8 are allocated, whereas L1 bits 5-6 and 9 are free.

Thus, the largest contiguous free space is indicated by bits 5-6 or two bits, as indicated by "Free Extent: 2" in L2 bitmap block 140A.

If one bit corresponds to one allocation unit, then the free space bitmap directly maps to allocation units in allocation stripe 154A of FIG. 1A. Other embodiments may map one L1 bit to multiple allocation units, in which case one bit refers to multiple contiguous allocation units. Assuming that each allocation stripe contains 10 allocation units and that one L1 bit maps to 1 allocation unit, the required number of entries in the free space bitmap is 10 divided by 1, or 10 entries. If one L1 block mapped to 3 allocation units, then the required number of entries would be 10 divided by 3, or 4 entries (rounded up to the nearest integer).

As previously discussed, each L1 bitmap block may have various additional metadata in addition to the free space bitmap. For example, L1 bitmap block 130A references its owner by "Owner: 140A", and the last time the free space bitmap was modified by "Modified: 15 days". L1 bitmap block 130B references its owner by "Owner: 140B", and the last time the free space bitmap was modified by "Modified: 1 min." While the last modified time is shown as a relative time for simplicity, actual implementations may utilize a recorded timestamp that is compared to a current system time to derive the relative time. In this manner, tablespace stack layer 106 can judge whether particular L1 bitmap blocks are hot, or high update activity, versus cold, or low update activity. As previously described, this metadata could also be tracked at the bitmap level, in which case the last modified time for all 10 L1 bits are maintained, rather than just a single last modified time for the entire L1 bitmap block.

Additionally, to support higher concurrency, each L1 bitmap block may be split into distinct areas. For example, if an L1 bitmap block includes a million entries in the free space bitmap, then the free space bitmap may be split into smaller areas having thousands of entries, allowing a single L1 bitmap block to support multiple concurrent tablespace space management operations by distributing space operations to the different areas. In a sense, this extends the tablespace metadata hierarchy to have an additional level below the L1 level. Further, to ensure data consistency, each L1 bitmap block may include a transaction log for recording changes to the free space bitmaps, which may also be maintained for each distinct area when the L1 bitmap block is split. Thus, the structure of the hierarchical tablespace metadata enables finer granularity for locking contention concurrency control, especially when compared to locally-managed tablespaces where the entire local free space bitmap for a particular file must be locked and processed serially for modifications.

Database Management System Process Overview

Before discussing the details of tablespace stack layer 106, it may be helpful to review a general process of how a tablespace stack layer interfaces with a database management system (DBMS). FIG. 2A is a flow diagram that depicts a process for performing a database operation using hierarchical tablespace metadata, according to an embodiment. Process 200 begins with block 202, where a DBMS stores tablespace metadata describing a tablespace of a database. Referring to FIG. 1A, this may correspond to database management system 100 storing tablespace metadata 122C within database 120, and also providing tablespace metadata 122A and 122B to respective database instances 110A and 110B. The storing of the tablespace metadata may be carried out by tablespace stack layer 106.

At block 204 in process 200 of FIG. 2A, referring to FIG. 1A, database instance 110A receives a request to perform an operation on user data tablespace 150. For example, a user may use a database client to enter a SQL insert statement for inserting a number of rows into a table, where a segment for the table is stored in user data tablespace 150. Database management system 100 may receive the SQL insert statement from the database client and delegate a specific database instance to perform a request to insert the rows. For example, based on server load or other criteria, database instance 110A may be chosen as the most appropriate database instance. Other operations may include deleting and moving records, consolidating free space, adding or removing segments, extending the tablespace and data files, and various other operations that require modification to user data tablespace 150. These operations may result from database client actions as above or internally from database management system 100, for example to carry out background database maintenance tasks.

At block 206 in process 200 of FIG. 2A, referring to FIG. 1A, database management system 100 updates tablespace metadata 122A-122C as appropriate, according to the requested operation, wherein the tablespace metadata is organized by a hierarchy as illustrated in FIGS. 1A and 1B. For example, continuing with the insertion of rows example, block 206 may invoke segment stack layer 108 to determine whether the segment has enough free space to accommodate the inserted rows. If not, segment stack layer 108 can extend the segment with an extent to accommodate the inserted rows. Segment stack layer 108 may invoke tablespace stack layer 106 to locate free space for the extent within the tablespace metadata, updating allocation units referenced by the extent as filled once located in the tablespace metadata.

As discussed above, the hierarchy is divided into at least two levels, a level 1 (L1) bitmap block level and a level 2 (L2) bitmap block level. Referring to FIG. 1A, the L1 bitmap block level includes L1 bitmap blocks 130A-130D mapping free space to allocation units within allocation stripes 154A-154D of user data tablespace 150. The L1 bitmap block level is stored as a single copy in database 120, shared by all of the database instances 110A-110B. As shown in FIG. 1C, each L1 bitmap block may indicate an instance ownership affinity from one of the database instances 110A-110B by specifying the L2 bitmap block owner 140A or 140B. The instance ownership affinity indicates exclusive write and modify access for the referenced L2 bitmap block and its assigned database instance.

Referring to FIG. 1B, the L2 bitmap block level includes L2 bitmap blocks 140A-140B mapping to the L1 bitmap block level, or L1 bitmap blocks 130A-130D. As shown in FIG. 1A, the L2 bitmap block level is stored as a plurality of local copies, or L2 bitmap blocks 140A and 140B, which are each assigned to one of the database instances 110A-110B.

A third metadata level, L3 file metadata 160, is also provided to identify all of the database instances and also points to data file 152 within user data tablespace 150. The L3 file metadata 160 may also include other high-level data such as the size of user data tablespace 150 and any tablespace metadata parameters and settings.

After block 206, the tablespace metadata in the above described hierarchy is updated to reflect the new allocation of allocation units, the freeing of allocation units, the changing of bitmap block instance ownership affinities, and other tablespace metadata state changes. Since the tablespace metadata processing in block 206 can execute in a highly parallelized fashion due to the hierarchical structure of the free space metadata, database management system 100 can reduce the proportion of time waiting for the tablespace metadata to be updated.

As the tablespace metadata operations are complete after block 206, database management system 100 can now execute the actual database operation on the tablespace, or user data tablespace 150. For example, database management system 100 may populate the newly allocated extent in data file 152 with the inserted row data, updating a corresponding extent map using segment stack layer 108.

Database Manageability

Note that process 200 does not require the end user of the database to understand anything about the hierarchical structure of the tablespace metadata. The user only issues database queries and commands to database management system 100 as usual, which are received as the request in block 204. Tablespace stack layer 106 handles all of the tablespace space allocation management without requiring the end user to configure any settings or parameters. These settings may include items such as the size of each allocation stripe and the number of allocation units mapped by each L1 block, and may also be stored in L3 file metadata 160 as described above. Appropriate settings may be automatically set based on statistics, the size of the tablespace, the number of database instances available and their resources, and other criteria. In some embodiments, these settings may be made available to edit by advanced database administrators.

Accordingly, database management is greatly simplified as big data sets do not need to be manually split into smaller data files to achieve greater parallelism of locally managed tablespace free space management. Instead, the end user is free to make a tablespace as large as needed to scale up to any big data set, leaving tablespace stack layer 106 to optimally carry out the free space management using a highly parallel tablespace metadata hierarchy.

Tablespace Stack Layer Process Overview

With the greater context of process 200 explained as above, the operation of tablespace stack layer 106 can now be examined in greater detail. FIG. 2B is a flow diagram that depicts a process for allocating a new extent by a tablespace stack layer using hierarchical tablespace space management, according to an embodiment. Process 220 of FIG. 2B may correspond to block 206 of FIG. 2A, where the operation corresponds to inserting a number of rows into a table, and where a segment for the table is stored in user data tablespace 150.

Process 220 begins with block 222, where tablespace stack layer 106 receives a request from segment stack layer 108 to allocate a new extent having a number of allocation units. For example, segment stack layer 108 may first determine that there is insufficient space in the segment to insert the new rows. Accordingly, based on the parameters in L3 file metadata 160 and the composition of the rows to be inserted, segment stack layer 108 can determine the number of allocation units required in a new extent to extend the segment, which are then passed in the request to tablespace stack layer 106. For this example, the number of allocation units may be three (3).

At block 224 in process 220 of FIG. 2B, referring to FIG. 1A, tablespace stack layer 106 checks a local L2 bitmap block for a self-owned L1 bitmap block indicating contiguous free space for the number of allocation units in the request of block 222. Since the request to perform the operation of inserting the rows is received at database instance 110A in block 204 of process 200, the local L2 bitmap block corresponds to L2 bitmap block 140A. If the request to perform the operation was instead received at database instance 110B, then the local L2 bitmap block would correspond to L2 bitmap block 140B.

Examining L2 bitmap block 140A in FIG. 1C, since the number of entries in L2 bitmap block 140A is two, the entries can be examined for free space sequentially. However, in a large L2 bitmap block having many entries, a sequential examination of entries may lead to high contention between database instances and a large number of rejected candidates before finding an entry with sufficient free space. Accordingly, hash algorithms and other methods may be utilized to select a candidate entry for examination, allowing database instances to spread the examining load evenly across the L2 bitmap block entries. Data structures may be optionally maintained for each L2 bitmap block to assist in selecting candidate entries. For example, a tree structure may include local L2 entries referencing self-owned L1 bitmap blocks, where the entries are sorted by available free space.

Entry 141A may be selected as a first candidate entry to examine for free space, as described above. Entry 141A indicates a self-owned L1 bitmap block, or L1 bitmap block 130A. Since additional free-space metadata in entry 141A already indicates that the largest free extent is 2 blocks wide, L1 bitmap block 130A does not have enough space to accommodate the 3 allocation unit request of block 224. However, if the request was for 2 contiguous allocation units instead of 3 allocation units, then block 224 may proceed to block 226, allocating L1 blocks 5-6 in the free space bitmap of L1 bitmap block 130A.

Continuing to entry 142A, it can be seen that L1 bitmap block 130B is owned by a remote L2 bitmap block, or L2 bitmap block 140B. Accordingly, all entries with self-owned L1 bitmap blocks have been exhausted, and there are no self-owned L1 bitmap blocks that can accommodate the requested 3 contiguous allocation units. Accordingly, block 224 proceeds to block 228.

At block 228 in process 220 of FIG. 2B, referring to FIG. 1A, tablespace stack layer 106 handshakes with a second database instance to allocate the requested extent in a remotely owned L1 bitmap block. In one approach, the local L2 bitmap block 140A may be utilized to identify candidate remotely owned L1 bitmap blocks, similar to the candidate testing in block 224 as described above. These candidates may then be tested by handshaking with the associated database instance. However, because additional free-space metadata may not be maintained for entries referencing remotely owned L1 bitmap blocks, this approach may be unable to select candidates in an optimal manner.

Another approach is to handshake with a remote database instance to delegate the task of finding the L1 bitmap block. This approach may be preferable since the remote database instance has direct local access to the remote L2 bitmap block. The remote database instance can then select free space candidates in an optimal manner, since additional free-space metadata for self-owned blocks are directly accessible from the remote L2 bitmap block. The specific database instance to handshake with may depend on the composition of the local L2 bitmap block 140A, server load levels, and any other information available to tablespace stack layer 106. Since the only other remote database instance in FIG. 1A is database instance 110B, block 228 may proceed by communicating with database instance 110B as the second database instance.

Using a process similar to that described above in block 224, tablespace stack layer 106 of database instance 110B can identify that L1 bitmap block 130B has a maximum free extent of 7 allocation units, easily accommodating the original request for 3 allocation units. Accordingly, L1 bits 3-5 are marked as allocated in the free space bitmap and the "Modified" field is updated to "Now", as reflected in the state change of L1 bitmap block 130B from FIG. 1C to FIG. 1D.

At block 230 in process 220 of FIG. 2B, referring to FIG. 1A, tablespace stack layer 106 updates the L2 bitmap block(s) according to the allocation in block 226 or block 228. If process 220 proceeded with block 226, only the local L2 bitmap block 140A may need to be updated, for example to update the extra metadata "Free Extent" field in entry 141A. If process 220 proceeded with block 228 as described above, then the remote L2 bitmap block 140B may need to be updated for similar reasons, for example to update the extra metadata "Free Extent" field in entry 142B.

Transfer of L1 Bitmap Block Ownership

Additionally, tablespace stack layer 106 can also take the opportunity to transfer the ownership of L1 bitmap block 130B in block 230. For example, tablespace stack layer 106 may examine the last modified metadata within L1 bitmap block 130B of FIG. 1C, seeing that the last modified time was 1 minute ago. Since this is fairly recent, tablespace stack layer 106 may conclude that L1 bitmap block 130B is hot and frequently updated, and may decline to transfer ownership of L1 bitmap block 130B since database instance 110B may be frequently updating the space bitmap of L1 bitmap block 130B. Accordingly, as shown in FIG. 1D which represents the state of the tablespace metadata after the completion of block 230, the ownership affinities all remain the same as they were in FIG. 1C, which represents the state of the tablespace metadata prior to the start of process 220, or block 206.

Figure 1E:
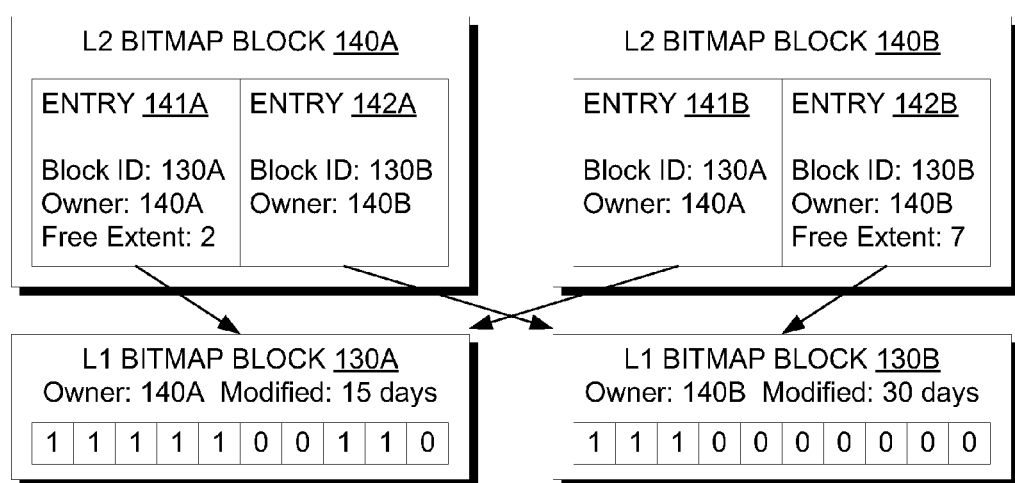

On the other hand, consider block 230 in the context of FIG. 1E, which is identical to FIG. 1C with the exception that the "Modified" field for L1 bitmap block 130B is changed from 1 minute to 30 days. Process 220 may proceed identically as described above until block 230 is reached. Once block 230 is reached, tablespace stack layer 106 may examine the last modified metadata within L1 bitmap block 130B of FIG. 1E, seeing that the last modified time was 30 days ago. Since this is almost a month ago, tablespace stack layer 106 may conclude that activity for L1 bitmap block 130B is relatively low or "cold", and may decide to transfer ownership of L1 bitmap block 130B to L2 bitmap block 140A. Thus, the "temperature" or access history of an L1 bitmap block may be compared to a heat threshold to decide whether to transfer ownership or not. Besides using the last modified activity, other criteria such as the percentage of free blocks available may also be factors in determining whether to transfer L1 bitmap block ownership.

Figure 1F:
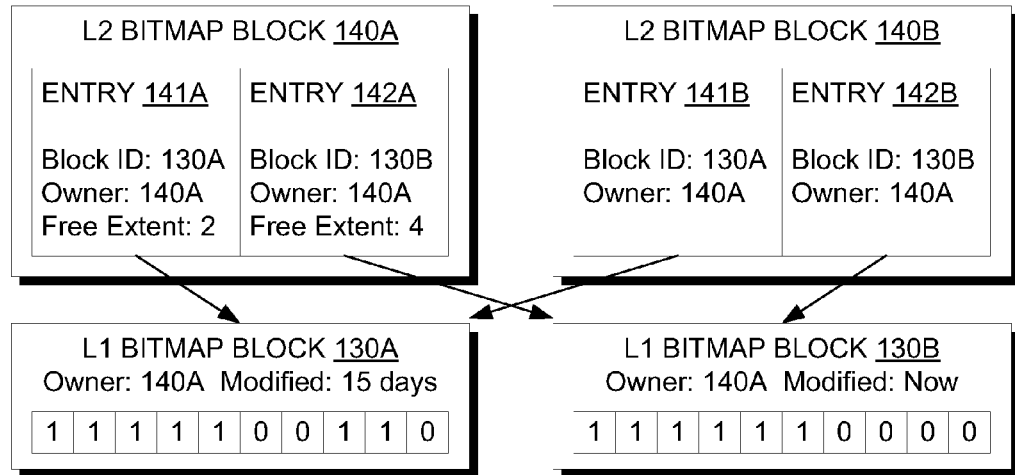

The transfer of ownership is reflected in the state change from FIG. 1E to FIG. 1F, where entry 142A in L2 bitmap block 140A and entry 142B in L2 bitmap block 140B update the "Owner" field to reflect the transferred ownership. The "Owner" field in L1 bitmap block 130B is also updated to point to L2 bitmap block 140A. Since entry 142B no longer references a self-owned block, the extra metadata for largest free extent may be deleted. On the other hand, since entry 142A now references a self-owned block, the extra metadata for largest free extent may be added to entry 142A. Thus, the local and remote L2 bitmap blocks can be updated to reflect the ownership change. In this manner, ownership of L1 bitmap blocks with low or "cold" update activity can be transferred to database instances that can use the additional blocks.

Expansion and Consolidation

The above examples assume that a L1 bitmap block with enough free space will be found in a local or a remote database instance. However, tablespace stack layer 106 may eventually encounter a situation where a L1 bitmap block with sufficient free space cannot be found locally or remotely. To avoid this situation, database management system 100 may periodically consolidate and reclaim free space in the allocation stripes. For example, referring to L1 bitmap block 130A in FIG. 1C, the free space may be consolidated by moving L1 bits 7-8 to L1 bits 5-6, reclaiming a larger empty space of 3 contiguous allocation units at L1 blocks 7-9. Besides updating the tablespace metadata, the actual data in the corresponding allocation stripe 154A may also be moved as well, physically and/or logically. If this consolidation occurred prior to the example discussed above in conjunction with process 200, then the requested extent of 3 allocation units could have been allocated locally in L1 bitmap block 130A.

If user data tablespace 150 is permitted to expand, then data file 152 may be expanded in size as necessary to provide additional allocation stripes. For example, after the available free space in data file 152 falls below a certain threshold or based on other triggering criteria, then a number of additional allocation stripes may be added to data file 152. These additional allocation stripes may have corresponding new L1 bitmap blocks created in tablespace metadata 122C. By default, the ownership affinity of the new L1 bitmap blocks may be assigned evenly to the available database instances. In other embodiments, server load levels and other criteria may be used to weight the assignment of the new L1 bitmap blocks to specific database instances.

The expansion of data file 152 may occur with regards to a specific database instance, rather than generally for all database instances as described above. For example, the threshold discussed above may pertain only to those L1 bitmap blocks owned by the specific database instance. Additional allocation stripes may be added to data file 152 and corresponding new L1 bitmap blocks may be created in tablespace metadata 122C, with all ownership affinities set to the specific database instance. Only the L2 bitmap block local to the specific database instance is updated with these new L1 bitmap blocks, thereby minimizing communications overhead between the database instances. However, the other remote L2 bitmap blocks can also be optionally updated.

Proactive background space allocation and reclamation may occur when the above thresholds or triggering criteria are set to aggressive levels. By "proactive", this means that additional allocation stripes and consolidated reclaimed free space are provided well in advance of out-of-space situations, particularly those situations that require heavy handshaking between database instances. While this proactive approach may consume storage and memory resources at a greater pace, this may be an acceptable tradeoff to achieve higher levels of parallelism and reduced communication overhead between database instances.

It should be appreciated that database management system 100 may dynamically add or remove database instances to scale with the database workload and with available server resources. In this case, tablespace stack layer 106 may also modify L3 file metadata 160 as necessary to keep track of the new database instances. L2 bitmap blocks may be generated, merged, moved, or deleted to accommodate the creation and deletion of database instances, and L1 bitmap blocks may also be updated accordingly.

Thus, the use of a hierarchical organization of tablespace free space metadata as described above enables a higher level of concurrency to accommodate the performance requirements of large tablespaces with big data sets. These advantages are especially apparent when compared to locally managed tablespaces, where large tablespaces must be manually split into many smaller files to gain sufficient concurrency at the cost of increased administrative complexity. On the other hand, since the hierarchical structure can be transparently integrated as part of the tablespace stack layer in a database management system (DBMS), end users do not have to understand or edit any additional settings or parameters, thereby minimizing database administration, maintenance, and development complexity.

Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. A language for expressing the database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of the resources from a node is a server that is referred to herein as a "server instance" or "instance".

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
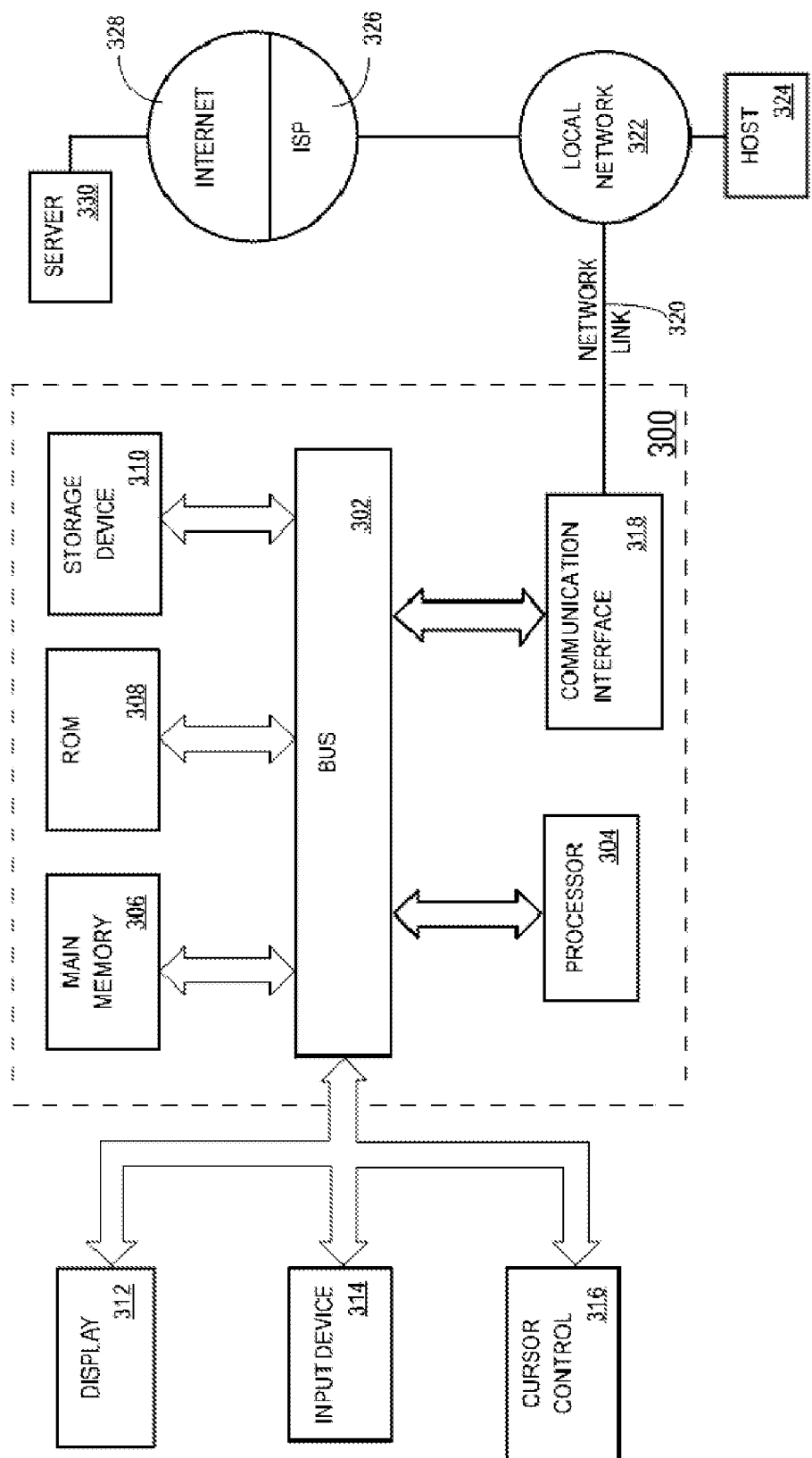
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising steps of:
    storing tablespace metadata describing a tablespace of a database;
    receiving, at a first instance of a plurality of database server instances for the database, a request to perform an operation on the tablespace;
    allocating free space comprising one or more allocation units within said tablespace by at least updating the table metadata according to the operation;
    wherein the tablespace metadata is organized by a hierarchy comprising:
    a level 1 (L1) bitmap block level comprising a plurality of L1 bitmap blocks mapping free space of a plurality of allocation units in the tablespace, wherein each of the plurality of L1 bitmap blocks indicates an ownership affinity with one of the plurality of database server instances, and wherein the L1 bitmap block level is stored as a single copy shared by the plurality of database server instances;
    a level 2 (L2) bitmap block level comprising a plurality of L2 bitmap blocks each mapping to each of the plurality L1 bitmap blocks of the L1 bitmap blocks level, wherein each of the plurality of database server instances is assigned to store one of the plurality of L2 bitmap blocks;
    wherein the method is performed by one or more computing devices.

2. The method of claim 1, wherein each of the plurality of L2 bitmap blocks includes the ownership affinity for each mapped L1 bitmap block.

3. The method of claim 1, wherein each of the plurality of L2 bitmap blocks includes additional free-space metadata for each mapped L1 bitmap block that is self-owned in the respective L2 bitmap block, wherein each mapped L1 bitmap block is self-owned when the ownership affinity of the mapped L1 bitmap block matches an assigned instance for the respective L2 bitmap block.

4. The method of claim 1, wherein each of the plurality of L1 bitmap blocks maps free space of an allocation stripe having a fixed number of allocation units.

5. The method of claim 4, wherein each of the plurality of L1 bitmap blocks is stored in a pre-allocated metadata header area of the mapped allocation stripe.

6. The method of claim 1, wherein each of the plurality of L1 bitmap blocks maps is split into distinct areas.

7. The method of claim 1, wherein each of the plurality of L1 bitmap blocks maps include a transaction log.

8. The method of claim 1, wherein the updating of the tablespace metadata is by a tablespace stack layer of a database management system for the database.

9. The method of claim 1, wherein the plurality of L2 bitmap blocks include a local L2 bitmap block stored at the first instance, wherein the request comprises allocating a new extent in the tablespace, and wherein the updating of the tablespace metadata comprises:
    checking, at the first instance, the local L2 bitmap block for a self-owned L1 bitmap block indicating contiguous free space for the new extent, wherein the self-owned L1 bitmap block is self-owned when the ownership affinity of the self-owned L1 bitmap block matches the first instance.

10. The method of claim 9, wherein the updating of the tablespace metadata further comprises:
    allocating the new extent in the self-owned L1 bitmap block in response to finding the self-owned L1 bitmap block;
    updating additional free-space metadata in the local L2 bitmap block for the self-owned L1 bitmap block.

11. The method of claim 9, wherein the updating of the tablespace metadata further comprises:
    handshaking with a second instance of the plurality of database server instances to allocate the new extent in a remotely owned L1 bitmap block in response to not finding the self-owned L1 bitmap block, wherein the remotely owned L1 bitmap block is remotely owned when the ownership affinity of the remotely owned L1 bitmap block does not match the first instance;
    updating additional free-space metadata in a remote L2 bitmap block for the remotely owned L1 bitmap block.

12. The method of claim 11, wherein the updating of the tablespace metadata further comprises:
    changing the ownership affinity of the remotely owned L1 bitmap block to the first instance in response to comparing an access history of the remotely owned L1 bitmap block to a heat threshold;

updating the local L2 bitmap block and the remote L2 bitmap block to reflect the changing.

13. The method of claim 1, further comprising: adding a new plurality of allocation units to the tablespace and corresponding new L1 bitmap blocks to the L1 bitmap block level in response to the L2 bitmap block level indicating available free space below a certain threshold.

14. The method of claim 1, wherein the hierarchy further comprises: a level 3 (L3) file level comprising filesystem metadata for the tablespace and instance metadata for the plurality of database server instances.

15. The method of claim 1, wherein a database management system periodically consolidates free space in each of the L1 bitmap blocks.

16. A non-transitory computer-readable medium storing one or more sequences of instructions which, when executed by one or more processors, cause performing of:
storing tablespace metadata describing a tablespace of a database;
receiving, at a first instance of a plurality of database server instances for the database, a request to perform an operation on the tablespace;
allocating free space comprising one or more allocation units within said tablespace by at least updating the tablespace metadata according to the operation;
wherein the tablespace metadata is organized by a hierarchy comprising:
a level 1 (L1) bitmap block level comprising a plurality of L1 bitmap blocks mapping free space of a plurality of allocation units in the tablespace, wherein each of the plurality of L1 bitmap blocks indicates an ownership affinity with one of the plurality of database server instances, and wherein the L1 bitmap block level is stored as a single copy shared by the plurality of database server instances;
a level 2 (L2) bitmap block level comprising a plurality of L2 bitmap blocks each mapping to each of the plurality of L1 bitmap blocks of the L1 bitmap block level, wherein each of the plurality of database server instances is assigned to store one of the plurality of L2 bitmap blocks.

17. The non-transitory computer-readable medium of claim 16, wherein the plurality of L2 bitmap blocks include a local L2 bitmap block stored at the first instance, wherein the request comprises allocating a new extent in the tablespace, and wherein the updating of the tablespace metadata comprises:
checking, at the first instance, the local L2 bitmap block for a self-owned L1 bitmap block indicating contiguous free space for the new extent, wherein the self-owned L1 bitmap block is self-owned when the ownership affinity of the self-owned L1 bitmap block matches the first instance;
handshaking with a second instance of the plurality of database server instances to allocate the new extent in a remotely owned L1 bitmap block in response to not finding the self-owned L1 bitmap block, wherein the remotely owned L1 bitmap block is remotely owned when the ownership affinity of the remotely owned L1 bitmap block does not match the first instance;
updating additional free-space metadata in a remote L2 bitmap block for the remotely owned L1 bitmap block.

18. The non-transitory computer-readable medium of claim 17, wherein the updating of the tablespace metadata further comprises:
changing the ownership affinity of the remotely owned L1 bitmap block to the first instance in response to comparing an access history of the remotely owned L1 bitmap block to a heat threshold;
updating the local L2 bitmap block and the remote L2 bitmap block to reflect the changing.

19. The non-transitory computer-readable medium of claim 16, wherein each of the plurality of L2 bitmap blocks includes the ownership affinity for each mapped L1 bitmap block.

20. The non-transitory computer-readable medium of claim 16, wherein each of the plurality of L2 bitmap blocks includes additional free-space metadata for each mapped L1 bitmap block that is self-owned in the respective L2 bitmap block, wherein each mapped L1 bitmap block is self-owned when the ownership affinity of the mapped L1 bitmap block matches an assigned instance for the respective L2 bitmap block.

21. The non-transitory computer-readable medium of claim 16, wherein each of the plurality of L1 bitmap blocks maps free space of an allocation stripe having a fixed number of allocation units.

22. The non-transitory computer-readable medium of claim 21, wherein each of the plurality of L1 bitmap blocks is stored in a pre-allocated metadata header area of the mapped allocation stripe.

23. The non-transitory computer-readable medium of claim 16, wherein each of the plurality of L1 bitmap blocks maps is split into distinct areas.

24. The non-transitory computer-readable medium of claim 16, wherein each of the plurality of L1 bitmap blocks maps include a transaction log.

25. The non-transitory computer-readable medium of claim 16, wherein the updating of the tablespace metadata is by a tablespace stack layer of a database management system for the database.

26. The non-transitory computer-readable medium of claim 16, wherein the plurality of L2 bitmap blocks include a local L2 bitmap block stored at the first instance, wherein the request comprises allocating a new extent in the tablespace, and wherein the updating of the tablespace metadata comprises:
checking, at the first instance, the local L2 bitmap block for a self-owned L1 bitmap block indicating contiguous free space for the new extent, wherein the self-owned L1 bitmap block is self-owned when the ownership affinity of the self-owned L1 bitmap block matches the first instance.

27. The non-transitory computer-readable medium of claim 26, wherein the updating of the tablespace metadata further comprises:
allocating the new extent in the self-owned L1 bitmap block in response to finding the self-owned L1 bitmap block;
updating additional free-space metadata in the local L2 bitmap block for the self-owned L1 bitmap block.

28. The non-transitory computer-readable medium of claim 16, storing instructions which, when executed by the one or more processors, further cause:
adding a new plurality of allocation units to the tablespace and corresponding new L1 bitmap blocks to the L1 bitmap block level in response to the L2 bitmap block level indicating available free space below a certain threshold.

29. The non-transitory computer-readable medium of claim 16, wherein the hierarchy further comprises:
a level 3 (L3) file level comprising filesystem metadata for the tablespace and instance metadata for the plurality of database server instances.

30. The non-transitory computer-readable medium of claim 16, wherein a database management system periodically consolidates free space in each of the L1 bitmap blocks.

31. A database management system comprising one or more computing devices configured to:
   store tablespace metadata describing a tablespace of a database;
   receive, at a first instance of a plurality of database server instances for the database, a request to perform an operation on the tablespace;
   allocating free space comprising one or more allocation units within said tablespace by at least update, by a tablespace stack layer, the tablespace metadata according to the operation;
   wherein the tablespace metadata is organized by a hierarchy comprising:
   a level 1 (L1) bitmap block level comprising a plurality of L1 bitmap blocks mapping free space of a plurality of allocation units in the tablespace, wherein each of the plurality of L1 bitmap blocks indicates an ownership affinity with one of the plurality of database server instances, and wherein the L1 bitmap block level is stored as a single copy shared by the plurality of database server instances;
   a level 2 (L2) bitmap block level comprising a plurality of L2 bitmap blocks each mapping to each of the plurality of L1 bitmap blocks of the L1 bitmap block level, wherein each of the plurality of database server instances is assigned to store one of the plurality of L2 bitmap blocks.

32. The database management system of claim 31, wherein the plurality of L2 bitmap blocks include a local L2 bitmap block stored at the first instance, wherein the request comprises allocating a new extent in the tablespace, and wherein the tablespace stack layer is configured to update the tablespace metadata by:
   checking, at the first instance, the local L2 bitmap block for a self-owned L1 bitmap block indicating contiguous free space for the new extent, wherein the self-owned L1 bitmap block is self-owned when the ownership affinity of the self-owned L1 bitmap block matches the first instance;
   handshaking with a second instance of the plurality of database server instances to allocate the new extent in a remotely owned L1 bitmap block in response to not finding the self-owned L1 bitmap block, wherein the remotely owned L1 bitmap block is remotely owned when the ownership affinity of the remotely owned L1 bitmap block does not match the first instance;
   updating additional free-space metadata in a remote L2 bitmap block for the remotely owned L1 bitmap block.

33. The database management system of claim 32, wherein the tablespace stack layer is further configured to update the tablespace metadata by:
   changing the ownership affinity of the remotely owned L1 bitmap block to the first instance in response to comparing an access history of the remotely owned L1 bitmap block to a heat threshold;
   updating the local L2 bitmap block and the remote L2 bitmap block to reflect the changing.

* * * * *